(12) United States Patent
Seth et al.

(10) Patent No.: US 9,824,372 B1
(45) Date of Patent: Nov. 21, 2017

(54) ASSOCIATING ADVERTISEMENTS WITH VIDEOS

(75) Inventors: Rohan Seth, Palo Alto, CA (US); Shumeet Baluja, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 1638 days.

(21) Appl. No.: 12/029,140

(22) Filed: Feb. 11, 2008

(51) Int. Cl.
*G06Q 30/00* (2012.01)
*G06Q 30/02* (2012.01)

(52) U.S. Cl.
CPC ..... *G06Q 30/0241* (2013.01); *G06Q 30/0251* (2013.01)

(58) Field of Classification Search
CPC .................................................. G06Q 30/0251
USPC .......................................................... 705/14
See application file for complete search history.

(56) References Cited

U.S. PATENT DOCUMENTS

| | | |
|---|---|---|
| 5,649,060 A | 7/1997 | Ellozy |
| 5,664,227 A | 9/1997 | Mauldin et al. |
| 5,724,521 A | 3/1998 | Dedrick |
| 5,740,549 A | 4/1998 | Reilly et al. |
| 5,848,397 A | 12/1998 | Marsh et al. |
| 5,946,658 A | 8/1999 | Miyazawa et al. |
| 5,948,061 A | 9/1999 | Merriman |
| 6,026,368 A | 2/2000 | Brown et al. |
| 6,044,376 A | 3/2000 | Kurtzman, II |
| 6,078,914 A | 6/2000 | Redfern |
| 6,091,416 A | 7/2000 | Cragun |
| 6,144,944 A | 11/2000 | Kurtzman, II et al. |
| 6,167,382 A | 12/2000 | Sparks et al. |
| 6,188,398 B1 | 2/2001 | Collins-Rector et al. |
| 6,269,361 B1 | 7/2001 | Davis et al. |
| 6,282,548 B1 | 8/2001 | Burner et al. |
| 6,282,713 B1 | 8/2001 | Kitsukawa et al. |
| 6,393,158 B1 | 5/2002 | Gould et al. |
| 6,401,075 B1 | 6/2002 | Mason et al. |
| 6,615,270 B2 | 9/2003 | Gould et al. |
| 6,621,980 B1 | 9/2003 | Gould et al. |
| 6,698,020 B1 | 2/2004 | Zigmond et al. |
| 6,771,290 B1 | 8/2004 | Hoyle |
| 6,810,411 B1 * | 10/2004 | Coughlin .......... H04L 29/12066 370/252 |
| 6,847,977 B2 | 1/2005 | Abajian |
| 6,976,028 B2 | 12/2005 | Fenton et al. |

(Continued)

FOREIGN PATENT DOCUMENTS

| | | |
|---|---|---|
| CN | 1728781 | 2/2006 |
| CN | 102112009 | 6/2011 |

(Continued)

OTHER PUBLICATIONS

International Search Report and Written Opinion for PCT Application No. PCT/US2008/068624, dated Aug. 4, 2009, 12 pages.

(Continued)

*Primary Examiner* — Matthew L Hamilton
(74) *Attorney, Agent, or Firm* — Foley and Lardner LLP; John D. Lanza

(57) ABSTRACT

The subject matter of this specification can be embodied in, among other things, a method that includes identifying web pages that embed a selected video, aggregating content derived from the identified web pages, and transmitting one or more advertisements (ads) that are targeted to the aggregated content for presentation with the selected video embedded on the identified web pages.

29 Claims, 6 Drawing Sheets

(56) References Cited

U.S. PATENT DOCUMENTS

| | | | |
|---|---|---|---|
| 6,978,470 B2 | 12/2005 | Swix et al. | |
| 6,985,882 B1 | 1/2006 | Del Sesto | |
| 6,990,496 B1 | 1/2006 | McGee, III et al. | |
| 6,996,564 B2 | 2/2006 | Lester et al. | |
| 7,039,599 B2 | 5/2006 | Merriman | |
| 7,043,746 B2 | 5/2006 | Ma | |
| 7,055,103 B2 | 5/2006 | Lif | |
| 7,058,963 B2 | 6/2006 | Kendall et al. | |
| 7,136,875 B2 | 11/2006 | Anderson et al. | |
| 7,158,966 B2 | 1/2007 | Brill et al. | |
| 7,165,069 B1 | 1/2007 | Kahle et al. | |
| 7,181,447 B2 | 2/2007 | Curtis et al. | |
| 7,194,527 B2 | 3/2007 | Drucker et al. | |
| 7,266,198 B2 | 9/2007 | Medvinsky | |
| 7,383,258 B2 | 6/2008 | Harik et al. | |
| 7,454,509 B2 | 11/2008 | Boulter et al. | |
| 7,467,218 B2 | 12/2008 | Gould et al. | |
| 7,506,356 B2 | 3/2009 | Gupta et al. | |
| 7,555,557 B2 | 6/2009 | Bradley et al. | |
| 7,559,017 B2 | 7/2009 | Datar et al. | |
| 7,584,490 B1 | 9/2009 | Schlack | |
| 7,593,965 B2 | 9/2009 | Gabriel | |
| 7,613,691 B2 | 11/2009 | Finch | |
| 7,630,021 B2 | 12/2009 | Matsuzaka et al. | |
| 7,657,519 B2 | 2/2010 | Anderson et al. | |
| 7,769,819 B2 | 8/2010 | Lerman et al. | |
| 7,806,329 B2 | 10/2010 | Dmitriev et al. | |
| 7,809,802 B2 | 10/2010 | Lerman et al. | |
| 7,912,217 B2 | 3/2011 | Baugher et al. | |
| 7,930,391 B1* | 4/2011 | Holt | G06Q 30/0255 705/14.53 |
| 7,937,724 B2 | 5/2011 | Clark et al. | |
| 7,966,632 B1 | 6/2011 | Pan et al. | |
| 7,986,372 B2 | 7/2011 | Ma et al. | |
| 8,041,601 B2 | 10/2011 | Fikes et al. | |
| 8,132,202 B2 | 3/2012 | Swix et al. | |
| 8,156,176 B2 | 4/2012 | Lerman et al. | |
| 8,196,166 B2 | 6/2012 | Roberts et al. | |
| 8,243,017 B2 | 8/2012 | Brodersen et al. | |
| 8,243,203 B2 | 8/2012 | Suh | |
| 8,689,251 B1 | 4/2014 | Heath | |
| 8,719,865 B2 | 5/2014 | Moonka et al. | |
| 2001/0003214 A1 | 6/2001 | Shastri et al. | |
| 2001/0047282 A1* | 11/2001 | Raveis, Jr. | G06Q 10/1095 705/7.19 |
| 2002/0002525 A1 | 1/2002 | Arai et al. | |
| 2002/0065813 A1 | 5/2002 | Scanlon et al. | |
| 2002/0116716 A1 | 8/2002 | Sideman | |
| 2002/0147782 A1 | 10/2002 | Dimitrova et al. | |
| 2003/0061305 A1 | 3/2003 | Copley et al. | |
| 2003/0154128 A1 | 8/2003 | Liga et al. | |
| 2003/0188308 A1 | 10/2003 | Kizuka | |
| 2004/0059708 A1 | 3/2004 | Dean et al. | |
| 2004/0133469 A1 | 7/2004 | Chang | |
| 2004/0133910 A1 | 7/2004 | Gordon et al. | |
| 2004/0226038 A1 | 11/2004 | Choi | |
| 2004/0267806 A1 | 12/2004 | Lester et al. | |
| 2005/0028190 A1 | 2/2005 | Rodriguez et al. | |
| 2005/0034151 A1 | 2/2005 | Abramson | |
| 2005/0091311 A1 | 4/2005 | Lund et al. | |
| 2005/0114198 A1 | 5/2005 | Koningstein et al. | |
| 2005/0120127 A1 | 6/2005 | Bradley et al. | |
| 2005/0207442 A1 | 9/2005 | Zoest et al. | |
| 2006/0013555 A1 | 1/2006 | Poslinski | |
| 2006/0015904 A1 | 1/2006 | Marcus | |
| 2006/0026628 A1 | 2/2006 | Wan et al. | |
| 2006/0053470 A1 | 3/2006 | Colter et al. | |
| 2006/0059510 A1 | 3/2006 | Huang et al. | |
| 2006/0090182 A1 | 4/2006 | Horowitz et al. | |
| 2006/0106709 A1 | 5/2006 | Chickering et al. | |
| 2006/0129533 A1 | 6/2006 | Purvis | |
| 2006/0140584 A1 | 6/2006 | Ellis et al. | |
| 2006/0179453 A1 | 8/2006 | Kadie et al. | |
| 2006/0195318 A1 | 8/2006 | Stanglmayr | |
| 2006/0214947 A1 | 9/2006 | Boose et al. | |
| 2006/0221222 A1 | 10/2006 | Hirasawa | |
| 2006/0224496 A1 | 10/2006 | Sandholm et al. | |
| 2006/0224693 A1 | 10/2006 | Gaidemak et al. | |
| 2006/0247998 A1* | 11/2006 | Gopalakrishnan | 705/37 |
| 2006/0259588 A1 | 11/2006 | Lerman et al. | |
| 2006/0259589 A1 | 11/2006 | Lerman et al. | |
| 2006/0271977 A1 | 11/2006 | Lerman et al. | |
| 2006/0277567 A1 | 12/2006 | Kinnear | |
| 2007/0073579 A1 | 3/2007 | Immorlica et al. | |
| 2007/0078708 A1 | 4/2007 | Yu et al. | |
| 2007/0078709 A1 | 4/2007 | Rajaram | |
| 2007/0089127 A1 | 4/2007 | Flickinger et al. | |
| 2007/0100690 A1 | 5/2007 | Hopkins | |
| 2007/0112630 A1 | 5/2007 | Lau et al. | |
| 2007/0113240 A1 | 5/2007 | McLean et al. | |
| 2007/0130602 A1 | 6/2007 | Gulli et al. | |
| 2007/0154163 A1* | 7/2007 | Cordray | H04N 21/6187 386/278 |
| 2007/0157228 A1 | 7/2007 | Bayer et al. | |
| 2007/0159522 A1 | 7/2007 | Neven | |
| 2007/0204310 A1 | 8/2007 | Hua et al. | |
| 2007/0245242 A1 | 10/2007 | Yagnik | |
| 2007/0277205 A1 | 11/2007 | Grannan | |
| 2007/0282893 A1 | 12/2007 | Smith et al. | |
| 2007/0288518 A1 | 12/2007 | Crigler et al. | |
| 2007/0288950 A1 | 12/2007 | Downey et al. | |
| 2008/0004948 A1 | 1/2008 | Flake et al. | |
| 2008/0005166 A1 | 1/2008 | Cragun et al. | |
| 2008/0021775 A1 | 1/2008 | Lerman et al. | |
| 2008/0027798 A1 | 1/2008 | Ramamurthi | |
| 2008/0033806 A1 | 2/2008 | Howe et al. | |
| 2008/0066107 A1 | 3/2008 | Moonka | |
| 2008/0077952 A1* | 3/2008 | St. Jean | G06Q 30/02 725/32 |
| 2008/0092159 A1 | 4/2008 | Dmitriev et al. | |
| 2008/0092182 A1 | 4/2008 | Conant | |
| 2008/0098420 A1 | 4/2008 | Khivesara et al. | |
| 2008/0109844 A1* | 5/2008 | Baldeschwieler | G06Q 30/02 725/35 |
| 2008/0120324 A1 | 5/2008 | Davis | |
| 2008/0139112 A1 | 6/2008 | Sampath et al. | |
| 2008/0140502 A1* | 6/2008 | Birnholz et al. | 705/10 |
| 2008/0155585 A1 | 6/2008 | Craner et al. | |
| 2008/0155588 A1 | 6/2008 | Roberts et al. | |
| 2008/0162206 A1* | 7/2008 | Mak | G06Q 30/0255 705/14.53 |
| 2008/0163071 A1* | 7/2008 | Abbott | G06Q 30/02 715/748 |
| 2008/0184117 A1* | 7/2008 | Alsbury | G06Q 30/02 715/719 |
| 2008/0189169 A1 | 8/2008 | Turpin et al. | |
| 2008/0201361 A1 | 8/2008 | Castro et al. | |
| 2008/0228578 A1* | 9/2008 | Mashinsky | G06F 21/10 705/14.54 |
| 2008/0229353 A1 | 9/2008 | Morris et al. | |
| 2008/0249855 A1 | 10/2008 | Collins et al. | |
| 2008/0263583 A1 | 10/2008 | Heath | |
| 2008/0263673 A1 | 10/2008 | Brun et al. | |
| 2008/0270883 A1* | 10/2008 | Friedman et al. | 715/209 |
| 2008/0276266 A1 | 11/2008 | Huchital | |
| 2008/0279349 A1* | 11/2008 | Jaffe | H04N 5/44591 379/88.14 |
| 2008/0300974 A1 | 12/2008 | Bhandari et al. | |
| 2008/0306999 A1 | 12/2008 | Finger et al. | |
| 2008/0320512 A1 | 12/2008 | Knight | |
| 2009/0006375 A1 | 1/2009 | Lax et al. | |
| 2009/0049469 A1 | 2/2009 | Small et al. | |
| 2009/0055375 A1 | 2/2009 | Oestlien et al. | |
| 2009/0070836 A1 | 3/2009 | Aaby et al. | |
| 2009/0119169 A1* | 5/2009 | Chandratillake | G06F 17/30796 705/14.46 |
| 2009/0132507 A1* | 5/2009 | Kadambi et al. | 707/4 |
| 2009/0157500 A1* | 6/2009 | Ames | G06Q 30/02 705/14.61 |
| 2009/0164419 A1 | 6/2009 | Taylor et al. | |
| 2009/0165041 A1* | 6/2009 | Penberthy et al. | 725/34 |
| 2009/0259941 A1* | 10/2009 | Kennedy, Jr. | G06F 17/3079 715/719 |

(56) References Cited

U.S. PATENT DOCUMENTS

| | | | |
|---|---|---|---|
| 2009/0287574 | A1 | 11/2009 | Kane |
| 2010/0037149 | A1 | 2/2010 | Heath |
| 2010/0125871 | A1 | 5/2010 | Liao et al. |
| 2010/0174607 | A1* | 7/2010 | Henkin et al. ............. 705/14.53 |
| 2010/0186028 | A1 | 7/2010 | Moore et al. |
| 2010/0278453 | A1 | 11/2010 | King |
| 2011/0131595 | A1 | 6/2011 | Xue et al. |
| 2011/0289531 | A1 | 11/2011 | Moonka et al. |
| 2013/0226690 | A1* | 8/2013 | Gross ......................... 705/14.41 |

FOREIGN PATENT DOCUMENTS

| | | |
|---|---|---|
| JP | 2003-242372 | 8/2003 |
| JP | 2006-155384 | 6/2006 |
| KR | 10-2002-0015858 | 3/2002 |
| KR | 10-2004-0069324 | 8/2004 |
| KR | 10-2006-0099253 | 9/2006 |
| WO | WO97/21183 | 6/1997 |
| WO | WO99/66719 | 12/1999 |
| WO | WO01/50296 | 7/2001 |
| WO | WO03/084219 | 10/2003 |
| WO | WO2006/111912 | 10/2006 |
| WO | WO2008-072874 | 6/2008 |

OTHER PUBLICATIONS

International Preliminary Report on Patentability for PCT Application No. PCT/US2008/068624, dated Jan. 5, 2010, 6 pages.
U.S. Appl. No. 11/438,473, filed May 22, 2006, Estimating Video Ad Performance, Moonka et al.
U.S. Appl. No. 12/028,710, filed Feb. 8, 2008, User Interaction Based Related Videos, He et al.
U.S. Appl. No. 12/637,635, filed Dec. 14, 2009, Target-Video Specific Co-Watched Video Clusters, He et al.
U.S. Appl. No. 13/619,961, filed Sep. 14, 2012, Selection of Advertisements for Placement with Content, Lax et al.
U.S. Appl. No. 13/620,191, filed Sep. 14, 2012, Content Recognition for Targeting Video Advertisements, Heath.
Communication pursuant to Article 94(3) EPC for EP Appl. No. EP 07 842 355.5-1502 dated Mar. 14, 2013, 6 pages.
European Search Report issued in international application No. 08756776.4 dated Apr. 20, 2001, 3 pages.
Communication Pursuant to Article 94(3) EPC issued in international application No. 08756776.4 dated Apr. 29, 2011, 7 pages.
PCT International Search Report and Written Opinion, PCT/US2008/062442, dated Jul. 14, 2008.
PCT International Search Report and Written Opinion, PCT/US2008/062103, dated Aug. 26, 2008.
International Preliminary Report on Patentability issued in international application No. PCT/US2008/062103 dated Nov. 3, 2009, 6 pages.
International Preliminary Report on Patentability issued in international application No. PCT/US2008/062442 dated Nov. 3, 2009, 7 pages.
International Preliminary Report on Patentability issued in international application No. PCT/US2008/066175 dated Dec. 11, 2009, 7 pages.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, Adknowledge, Aug. 1998.
AdKnowledge Market Match Planner: Reviewer's Guide, AdKnowledge, May 1998.
Ad-Star.com website archive from www.Archive.org. Apr. 12, 1997 and Feb. 1, 1997.
Baluja et al. "Video Suggestion and Discovery for YouTube: Taking Random Walks through the View Graph", ACM, WW 2008, Apr. 21-25, 2008.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency", Oct. 4, 1999.
Dedrick, R., A Consumption Model for Targeted Electronic Advertising, Intel Architecture Labs, IEEE, 1995.
Dedrick, R., Interactive Electronic Advertising, IEEE, 1994.
Greg Sandoval: "YouTube: Too rough for advertisers?" [online] [retrieved on Apr. 21, 2006]. Retrieved from the Internet: < URL: http://www.news.com >, 2 pages.
Information Access Technologies, Inc., Aaddzz brochure, "The Best Way to Buy and Sell Web Advertising Space," © 1997.
Information Access Technologies, Inc., Aaddzz.com website archive from www.Archive.org., archived on Jan. 30, 1998.
Lowe, D.G., "Object Recognition from Local Scale-Invariant Features," Proc. Seventh IEEE Int'l Conf on Computer Vision ICCV 99, Kerkyra, Greece, Sep. 20-27, 1999, pp. 1150-1157.
Raoul Emme, International Search Report and the Written Opinion in PCT/US2007/078299, dated Feb. 5, 2008, 29 pages.
So Young Doo, International Search Report and the Written Opinion in PCT/US2008/060859, dated Sep. 26, 2008, 10 pages.
Dorothée Mülhausen, International Preliminary Report on Patentability in PCT/US2007/078299, dated Mar. 26, 2009, 14 pages.
International Preliminary Report on Patentability for PCT Application No. PCT/US2008/066175, dated Dec. 23, 2009, 7 pgs.
International Search Report and Written Opinion from International Application No. PCT/US08/66175, dated Jun. 9, 2009, 8 pgs.
International Preliminary Report on Patentability from International Application No. PCT/US2008/073914, dated Mar. 4, 2010, 7 pgs.
International Search Report and Written Opinion from International Application No. PCT/US2008/073914 dated Jun. 23, 2009, 14 pgs.
Masashi Honda, International Preliminary Report on Patentability in PCT/US2008/060859, dated Oct. 29, 2009, 6 pages.
Mahesh Dwivedi, International Preliminary Report on Patentability for PCT Application No. PCT/US2008/068624, dated Jan. 5, 2010, 6 pages.
Jung Jin Kim, International Search Report and the Written Opinion in PCT/US2009/052866, dated Mar. 18, 2010, 11 pages.
Authorized officer Simin Baharlou, International Preliminary Report on Patentability in PCT/US2009/052866, dated Feb. 17, 2011, 7 pages.
Supplementary EP Search Report in EP 09 80 5508, dated Nov. 3, 2011, 5 pages.
Chinese Office Action in Chinese Application No. 200980130845.X, dated Dec. 27, 2011, 17 pages.
Supplementary EP Search Report in EP 08 74 6298, dated Jan. 23, 2012, 7 pages.
JP Office Action in Application No. 2009-528455, dated Aug. 13, 2012, 7 pages.
PC World, Steve Bass's Tips & Tweaks., http//blogs.pcworld.com/tipsandtweaks/archives/006418/html, downloaded Feb. 14, 2011, 2 pages.
Request for Reexamination of U.S. Pat. No. 6,829,587 B2, Control No. 95/001,068.
Request for Reexamination of U.S. Pat. No. 6,446,045 B1, Control No. 95/001,061.
Request for Reexamination of U.S. Pat. No. 7,240,025 B2, Control No. 95/001,073.
Request for Reexamination of U.S. Pat. No. 7,249,059 B2, Control No. 95/001,069.
Zeff, R., et al., Advertising on the Internet, 2nd Ed., John Wiley & Sons, 1999.
"Ad Serving with RealSystem™ G2," RealNetworks, 1999, 38 pages, [online] [Retrieved on Feb. 13, 2009] Retrieved from the internet <URL:http://service.real.com/help/library/blueprints/adserve/adserve.htm>.
"www.Scanscout.com," 2 pages, Archived on Apr. 7, 2007 on web.archive.org [online][Tretived on Oct. 19, 2009] Retrived from the internet: <URL:http://web.archive.org/web/20070407233129/http://www.scanscout.com/>.
"www.BrightRoll.com," 2 pages, Archived on Apr. 29, 2007 on web.archive.org [online] [Retrieved on Oct. 19, 2009] Retrieved

(56) References Cited

OTHER PUBLICATIONS from the internet: <URL:http://web.archive.org/web/20070429110654/http://www.birghtroll.com>.

AJAX Activity Indicators, Archived on Dec. 25, 2006 on www.web.archive.org [online] [Retrieved on Jun. 10, 2008] Retrieved from the internet <URL:http://web.archive.org/web/20061225134638/http://www/napyfab.com/ajax-indicators/>.

Strange, Adario, "VideoEgg Exec: YouTube's New Ads are Just Like Ours," [online], [Retrieved Jun. 2008, pp. 1-8,] Retrieved from the internet <URL://http://blog.wired.com/business/2007/08/network-wars-vi.html>.

"Overlay & Video AdType," ScanScout, 2007, [online] [Retrieved on Jul. 15, 2008] Retrieved from the internet <URL://demo.scanscount.com/livedemo.shtml?adType=overlay&videoAdType=rightSide&ss . . . >.

Riley, D., "Contextual In-Video Advertising: ScanScout," May 14, 2007, [online] [Retrieved on Jul. 15, 2008] Retrieved from the internet <URL://www.techcrunch.com/2007/05/14/contextual-in-video-advertising-scanscout/.>.

Delaney, Kevin J., "Start-Ups See to Cash in on Web-Video Ads", Wall Street Journal, Mar. 2, 2007,[online] [Retrieved Sep. 3, 2008] Retrieved from the internet <URL://www.scanscout.com/wsj-070302.html]>.

"www.YuMe.com," 2009, 1 Page, [online][Retrieved on Oct. 19, 2009] Retrieved from the internet: <URL:http://www.yume.com/>.

Korean Office Action in Korean Application No. 10-2009-7007416, dated Mar. 10, 2014, 13 pages (with English translation).

Japanese Second Office Action for JP 2009-528455 dated Jun. 18, 2013 w/English translation, 4 pages.

\* cited by examiner

ASSOCIATING ADVERTISEMENTS WITH VIDEOS

TECHNICAL FIELD

This instant specification relates to information management.

BACKGROUND

Users of video hosting systems, such as YOUTUBE, can upload videos for other people to view. Other users can place a video provided by the video hosting system on their web page by embedding or linking to the video sourced by the video hosting system.

The users that upload videos may or may not include a detailed description of the uploaded content. Some video hosting systems display content (e.g., advertising) associated with an uploaded video. Targeting advertisements (ads) to be associated with a video may be difficult if the uploaded video is not accompanied by sufficient metadata (e.g., an attending description). Some systems attempt to directly analyze the content of an uploaded video and select advertisements to display with the video based on this analysis.

SUMMARY

In general, this document describes selecting advertisements or other content to present with media without directly analyzing the content of the media.

In a first general aspect, a computer-implemented method is described. The method includes identifying content locations that embed a selected content item, aggregating content derived from the identified content locations, and transmitting one or more advertisements (ads) that are targeted to the aggregated content for presentation with the selected content item embedded on the identified content locations.

In a second general aspect, a computer-implemented method is described that includes identifying electronic documents that embed non-textual media, aggregating content derived from at least two of the electronic documents that embed the media, selecting an advertisement (ad) that corresponds to the aggregated content, and transmitting the selected ad for presentation with the non-textual media embedded in the electronic documents.

In another general aspect, a system is described. The system includes a data store having information that identifies content locations that embed a content item, means for aggregating content derived from the one or more identified content locations, and an advertising system that derives keywords based on the aggregated content and uses the keywords to identify corresponding advertisements for display with the embedded content item.

In yet another general aspect, a computer-implemented method is described that includes identifying web pages that embed a selected video, aggregating content derived from the identified web pages, and transmitting one or more advertisements (ads) that are targeted to the aggregated content for presentation with the selected video embedded on the identified web pages.

The systems and techniques described here may provide none, one, or more of the following advantages. First, an advertisement (ad) can be selected for display in association with a video without directly analyzing the content of the video. Second, an ad associated with a video presented on a web page can be selected even if the web page has minimal content. Third, ads to present with videos can be selected more efficiently because textual content of web pages may be more quickly analyzed than content within a video. Fourth, computational and storage savings can be achieved by selecting an ad to present with a video embedded in a first web page if the first web page has sufficient content to target the ad; otherwise, the ad can be selected based on content derived from multiple web pages that embed the video.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems, methods, computer program products and techniques for selecting advertisements (or other content) to display in association with a video based on content that is aggregated from one or more locations (e.g., web pages) that present the video. In some implementations, a system determines that several web pages include the video. The system aggregates content derived from the several web pages and determines which advertisements (ads) correspond to the aggregated content. This may permit targeted ads to appear with the video on the web pages even if a particular web page does not include sufficient content to determine a corresponding ad. While reference is made to presenting advertisements, other forms of content including other forms of sponsored content can be delivered by the system.

Figure 1A:
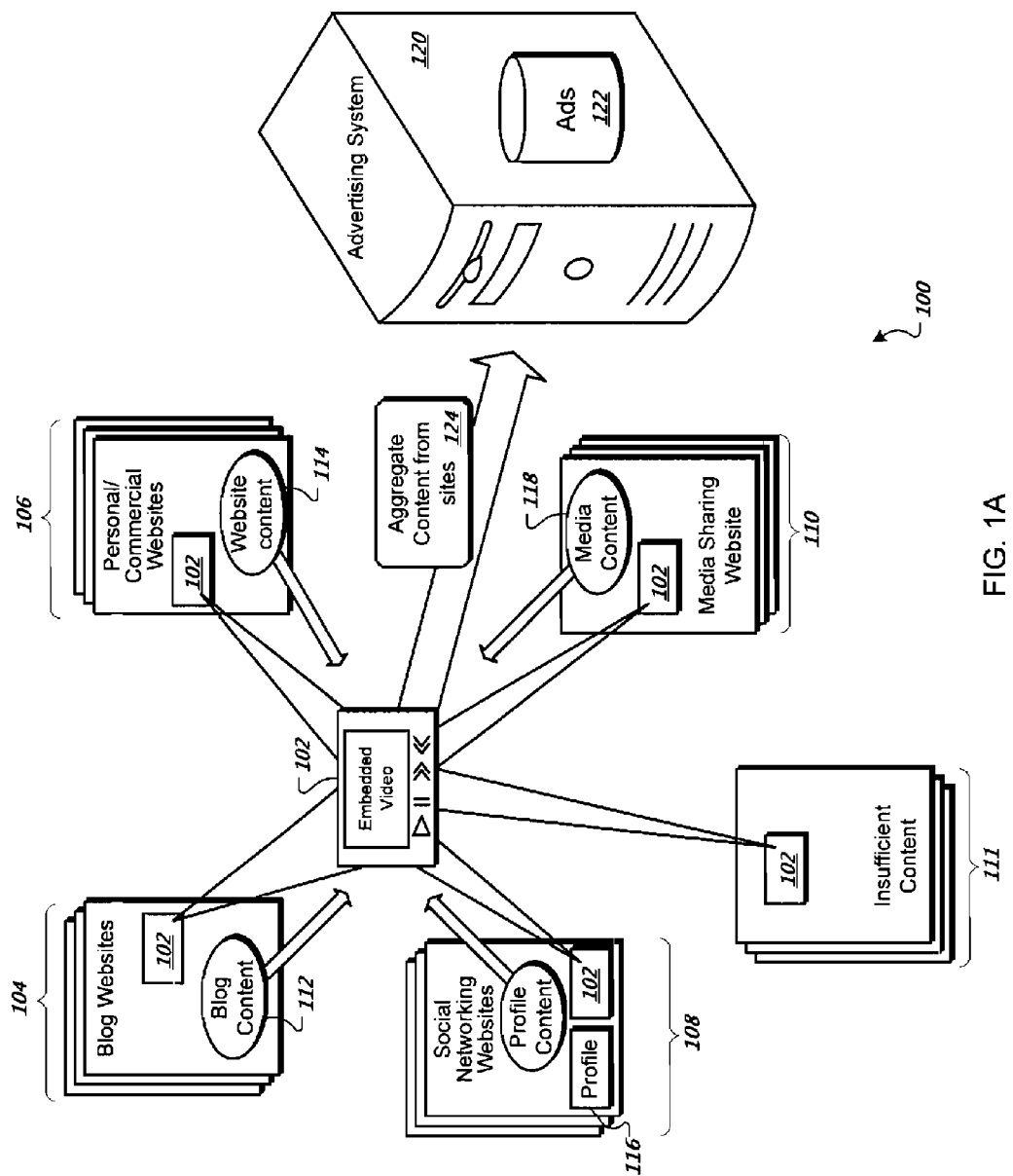
FIGS. 1A and 1B are diagrams of an example system that gathers aggregated content derived from web sites that embed a video and transmits ads for presentation with the embedded video based on the aggregated content.

FIG. 1A is a diagram of an example system 100 that gathers aggregated content derived from locations (e.g., web sites) that embed a video. In the example shown, system 100 includes an embedded video 102, which is presented on several web sites including blog web sites 104, personal or commercial web sites 106, social networking web sites 108, media sharing web sites 110, and other web sites 111.

Some the web sites that present the embedded video 102 may include content that is related to the web site or the embedded video 102. Other web sites—such as the web sites 111—may include a minimal amount or substantially no content besides the embedded video 102.

One example of content found on the blog web sites 104 can include blog commentary 112. The blog commentary 112 may be related to the embedded video. For example, the blog commentary 112 can include a description of what the video shows, a comment about the video, a review of the video, etc. The social networking web sites 104 can include profile information 116 about a social networking user. In some implementations, the social networking user may have uploaded the video to his or her profile page on the social network. In other implementations, a server outside the social network hosts the embedded video and the social networking user links to the video so that it is displayed on the user's profile page.

Additionally, in some situations, the user's profile page may not include any information about the video; however, the presence of other content on the same page may provide evidence that the video is related to the other content. In some implementations, content on a page that embeds or hosts the video (where the content is not necessarily explicitly referring to the video) is aggregated with content from other pages that embed or host the video, as previously described.

The media sharing web sites 110 can include media content 118. For example, the media content can include text, other videos, audio files, and images. Text on the media sharing web sites 110 can, for example, describe the media, rate the media, and refer viewers to other related media.

The personal or commercial web sites 106 can include web site content 114 such as images, descriptive text, and metadata. Content for these web sites 106 can describe a product or service offered for sale, contact information, current news related to a company or person, web accessible email, search results, photo galleries, etc.

In some implementations, web servers that host the web sites 104, 106, 108, 110, and 111 that display the embedded video 102 do not store the video 102. Instead, another web server (not shown) hosts the video and the web sites 104, 106, 108, 110, and 111 include markup language references (e.g., hypertext markup language (HTML) references) to the embedded video so that when a browser loads one of the web sites the video is also loaded for presentation.

The system 100 also includes an advertising system 120 that stores ads in a database 122. The advertising system 120 receives aggregated content 124 from the web sites 104, 106, 108, and 110. In some implementations, the advertising system can use the aggregated content 124 to determine which ads are most closely related to the aggregated content 124. For example, the advertisement system 120 can derive keywords from the aggregated content and match the derived content-based keywords with keywords associated with ads.

For instance, the aggregated content can include content from a blog that describes NASCAR events, content from a car dealership web site that describes sports car specifications, and content from a social networking web site that describes high-performance engine tweaks to improve a car's acceleration. The advertising system 120 can classify the aggregated content and determine that the aggregated content is related to the keywords: muscle cars, engine modifications, and racing. One or more ads may be associated with the content-based keywords muscle cars, engine modifications, and racing. The advertising system 120 can select the related ads for display as discussed in association with FIG. 1B.

Figure 1B:
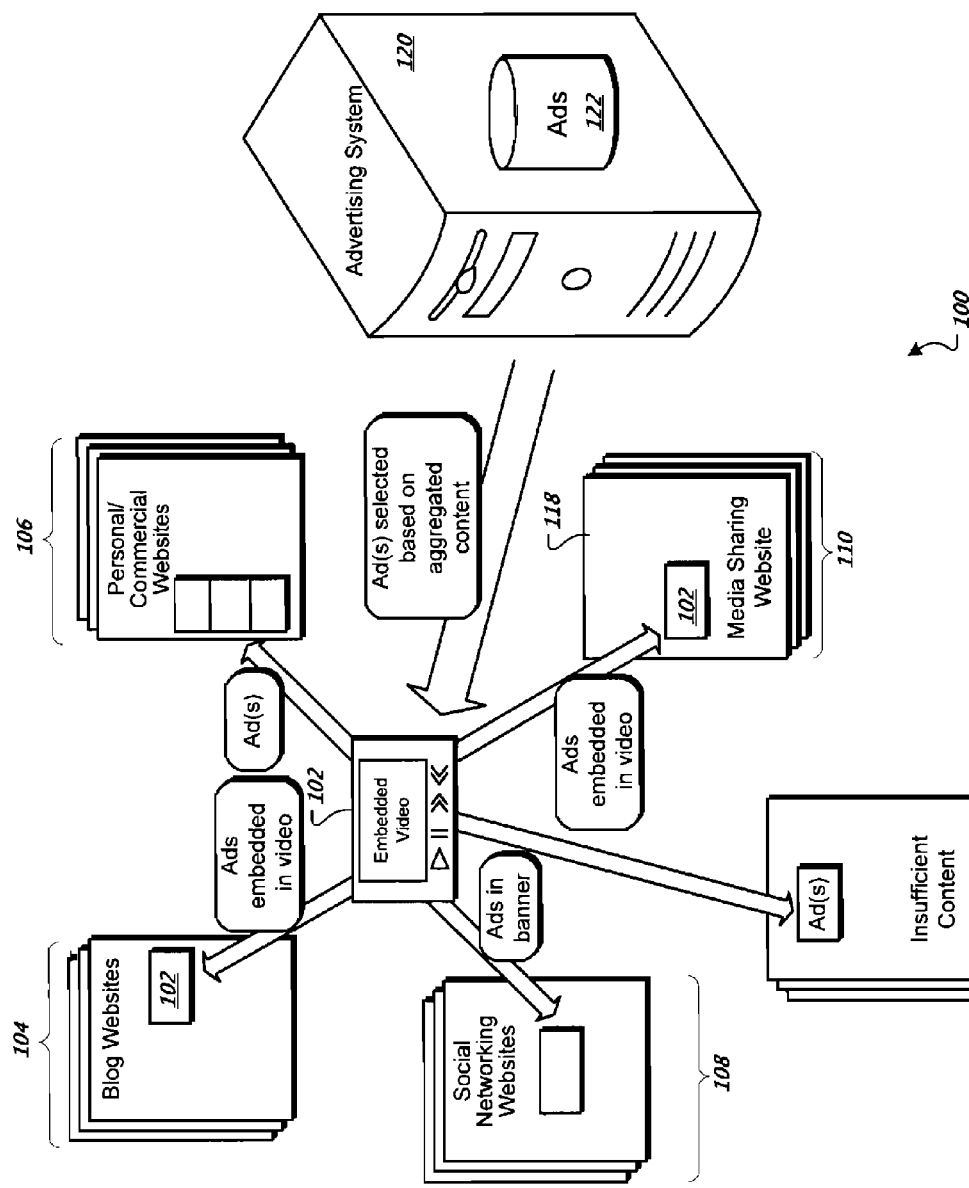

FIG. 1B is a diagram of the system 100 that transmits ads 130 for presentation with the embedded video 102 based on the previously received aggregated content 124 from the web sites. The advertising system 120 can transmit the ads for display to web sites, which can include web sites that may have little content besides the embedded video.

In some implementations, the advertising system 120 may have difficulty accurately targeting ads to associate with the embedded video 102 on web sites with minimal content if the advertising system 120 relied only on the minimal content. As shown in FIG. 1B, the advertising system can select ads to transmit to the web sites 104, 106, 108, 110 and 111 based on the aggregated content from all or a portion of the web sites that embed the video 102. This may permit accurately targeting ads to present with the video on the web sites 111 even though these web sites have minimal content.

In some implementations, the ads may be effectively targeted to the videos on web pages with little content because other web pages that embed the video are likely to have content that is associated with the video (e.g., describes the video, rates the video, etc.). The advertising system 120 can select the advertisements to display with the video based on web sites that have more content. The advertising system 120 then can transmit the selected advertisements to display with the video at the web sites that have minimal content.

In another implementation, an advertising system can select advertisements to display on the web pages having little content based on other web pages associated with the same domain. For example, the www.i-love-car-racing.com may have dozens of web pages about car racing, but a web page that embeds a particular video may have very little content. The content collection server 308 can retrieve content from one or more other web pages that are associated with the domain and pass this content (which may be an aggregation of content from the web pages at the domain) to the advertising system 316. The advertising system 316 can, in turn, select advertisements to present with the embedded video.

In yet another implementation, the content collection server 308 can retrieve content from other web pages associated with a domain of the web page that embeds the video. The content collection server 308 can incorporate this information into the aggregated content. For example, in addition to (or instead of) receiving the media site, blog, profile, and web page content from pages that embed a particular video, the content collection server can retrieve content from other web pages that are associated with a web page that embeds the video.

In some implementations, the other web pages are associated with the embedding web page because they are hosted under the same domain. In other implementations, the other web pages are associated with the embedding web page because the other web pages link to the embedding web page (e.g., via hyperlink) or because the embedding web page links to the other web pages.

Referring to FIG. 1B, the web sites can display the selected ads in a portion of a web site that is reserved for advertising. For example, the personal or commercial web sites 106 may have a portion of a web page reserved for GOOGLE ADSENSE ads. The portion can display the ads on the same web page that the video is displayed. In another example, the social networking web sites 108 can display the selected advertisements a banner that is displayed on a web page created by a user of the social network.

In another implementation, the selected ads can be inserted in the video 102. For example, the advertising system 120 may access a server that hosts the video and insert the ad so that the ad is presented before, along with or after the video 102 is played. In another implementation, the selected advertisement is presented during the video playback. For example, the ad can be a semi-transparent overlay positioned over a portion of the video so that it visible while the video plays. In another example, the advertising system 120 can redirect the link that embeds the video 102 so that the selected ad(s) are presented before (or after) the video 102 is played. After the ad is presented, the advertising system 120 can redirect the browser to the location originally identified by the link so that the video 102 is played.

In some implementations, the selected ads are inserted in other media that is hosted on the web site that displays the video 102. For example, the media sharing web sites 110 may include several videos that are available for display in addition to the video 102. The advertising system 120 can insert the selected ads in one of the other videos in addition to or instead of inserting the selected ads in the video 102. In yet other implementations, the selected ads can be inserted as text (e.g., GOOGLE's ADWORDS) displayed in association with the video 102 or as images in banners on the web page.

In some implementations, an ad can include a video. For example, a video advertisement can be inserted for viewing before the video 102 is played. In other implementations, the selected ad can include an audio file. For example, the audio file may be a voice over that is played during all or some of the video 102. In another implementation, the selected ad can be a static image or text that is shown before or after the video 102.

Figure 2:
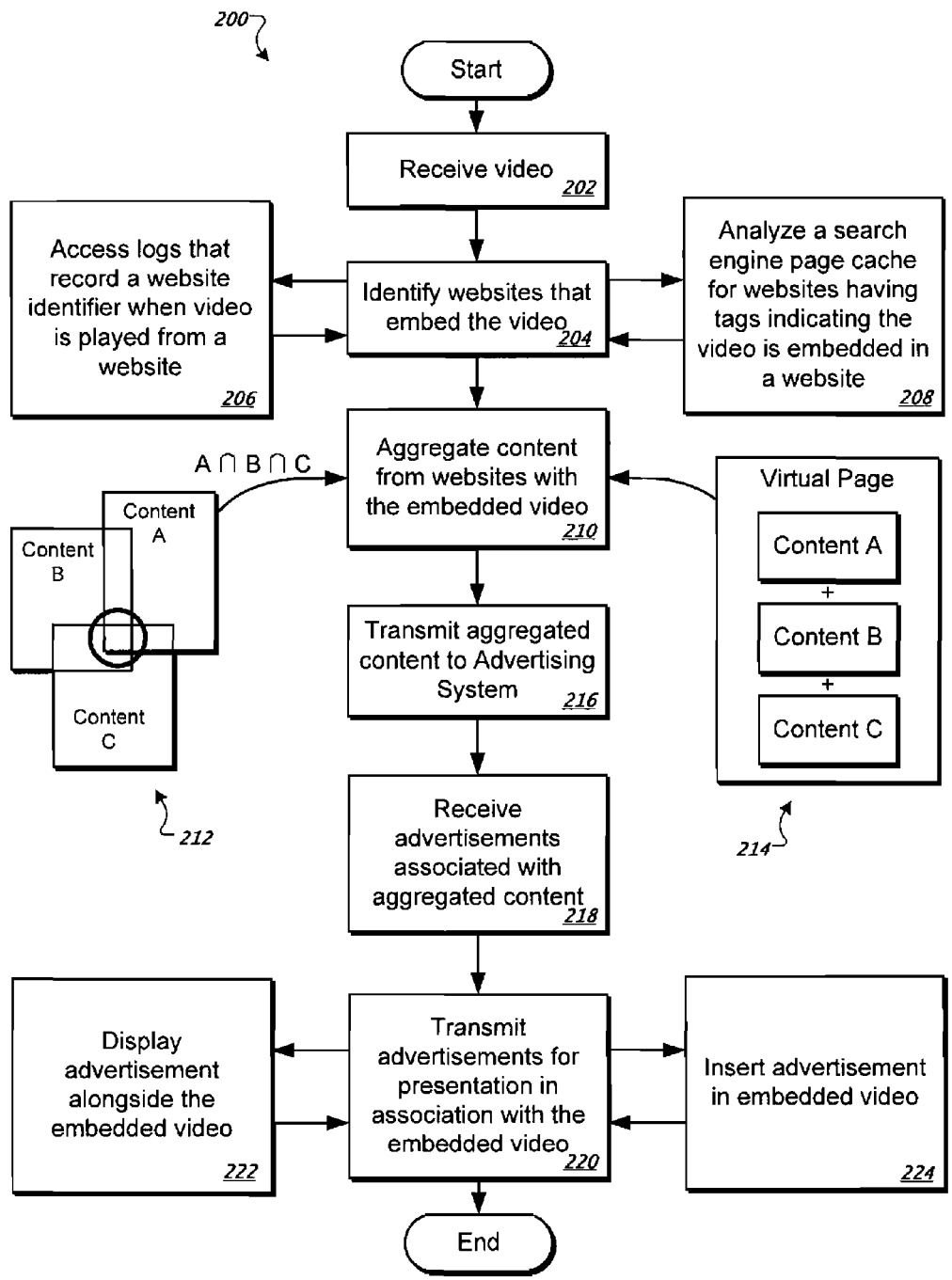
FIG. 2 is a flow chart of an example process for selecting advertisements to associate with videos or other media.

FIG. 2 is a flow chart of an example process 200 for selecting advertisements to associate with videos or other media. The process 200 can be performed, for example, by a system such as the system 100 or later described system 300. For clarity of presentation, the description that follows uses the system 100 as the basis of an example for describing the process 200; however, another system, or combination of systems, can be used to perform the process 200.

The process 200 can begin with step 202 in which a video is received. For example, in some implementations, a user may upload a video to a media-hosting server. The media-hosting server may be part of the system 100 which also includes the advertising system 120. For example, the media-hosting server may be a server associated with the YOUTUBE system. The user uploads the video to his or her YOUTUBE web page. The user may or may not have a significant amount of other content on the YOUTUBE page. If the user has content, it can include for example, a description of the video, comments about the video posted by other users, and a rating of the video.

In step 204, web sites that embed the video can be identified. The video can be embedded in web sites, for example, by including a uniform resource identifier (URI) for the video within HTML of a web site. For example if a user likes a video on YOUTUBE, the user may embed the video on the user's web page. More specifically, if the video is hosted by the YOUTUBE system, a user may include the following URI within the HTML of the user's web page:

<object width="425" height="353"><param name="movie" value="http://www.youtube.com/v/NYO0Ugqba4c&rel=1"></param><param name="wmode" value="transparent"></param><embed src="http://www.youtube.com/v/NYO0Ugqba4c&rel=1" type="application/x-shockwave-flash" wmode="transparent" width="425" height="353"></embed></object>

Execution of the example code displays the video whenever the web page that includes the code is loaded into, for example, an internet browser.

Once the video is embedded in a web site, a content collection server (not shown in FIG. 1) can identify web sites that have embedded the video.

In one implementation shown in step 206, logs of the media-hosting server are analyzed to determine which web sites have requested playback of the video. For example, the content collection server can analyze logs generated by the YOUTUBE system to determine what web sites have requested the video for playback. The logs may include, for example, query logs, general access request logs, resource access logs, page access logs, etc.

In another implementation shown in step 208, web pages that were encountered in association with a search engine's functions can be analyzed. For example, a search engine can index web pages in order to return web pages that correspond to search terms transmitted to the search engine. During the indexing process, the search engine can cache the web pages. The cached web pages can include code indicating a video is embedded in the web page. The content collection server can analyze the cached web pages to identify which web pages have embedded the video. In other implementations, the content collection server can analyze the web pages during the indexing process whether or not the web pages are cached or discarded later.

In step 210, content from web sites having the embedded video are aggregated. For example, the content collection server aggregates content from the blog web sites 104, the social networking sites 108, and media sharing sites 110. In some implementations, the content collection server transmits a request to the search engine for a cached version of the content from the web sites. In other implementations, the content collection server requests the content from the web sites themselves.

In some implementations, different weights can be assigned to each web site or type of web site. For example, the advertising system may give more weight to content originating from blog sites relative to content from social networking sites when selecting ads from the aggregated content. In another example, content from news sites may be weighted more than both blog and networking sites. In yet another example, web pages with a threshold number of page views (e.g., 100,000 per week) may be weighted more heavily than web pages with page views under the threshold. Different weights can be assigned based on several predetermined thresholds.

In some implementations, the assigned weights can be combined using a linear weighting algorithm or by a more complex learned weighting algorithm.

As shown in example 212, the aggregated content may be an intersection of substantially similar content (e.g., words and phrases) that is found within each of the web sites. For example, a first web site has content A that includes a discussion about "puppies" and "unicorns." A second web site has content B that includes a description of "puppies" and "cats," and a third web site has content C that includes text describing "puppies" and "hunting." The aggregated content from the first, second, and third web sites can include the content related to puppies because this content is similar to all three web sites. The aggregated content may not include the content related to "unicorns," "cats," or "hunting" because these subjects are only found on one of the web sites.

In some implementations, selecting content that is common to more than one of the web sites may increase a probability that the aggregated content is related to the video embedded in each of the web sites. The increase in probability is based on an assumption that common content found across several web sites that embed the video likely describes or is otherwise associated with the video.

In some implementations, the content collection server can aggregate content that it determines is similar or related. For instance, if the third web site in the previous example had content C that included text describing "dogs" and "hunting," the content collection server may aggregate the dog content with the puppies content because it determines that "dogs" and "puppies" are related. In some implementations, this determination is based on an index that cross-references related words, phrases, or subjects.

In another implementation shown in the example 214, the content collection server can aggregate all the content from web sites that embed the video. More specifically, the content collection server can create a virtual composite web page that includes content A, content B, and content C from the first, second, and third web sites, respectively. In some implementations, the collection server can transmit the virtual composite web page to a classifying system (not show) that determines keywords to associate with the content of web pages. For example, the collection server can transmit the virtual composite web page to a classifying system such as GOOGLE's ADSENSE system.

In step 216, the aggregated content is transmitted to the advertising system. For example, the content collection server can transmit the aggregated content to the advertising system 120, which includes the previously mentioned classifier that derives the content-based keywords from the aggregated content. The advertising system can use the content-based keywords to select advertisements to display as discussed in association with FIG. 1B.

In step 218, ad(s) associated with the aggregated content are received. For example, the content collection server can receive the ads. The content collection server then can transmit the ads to the web sites identified in step 204. In another implementation not shown in FIG. 2, the advertising system can directly transmit the ads to the web sites identified in step 204.

In step 220, the ads are transmitted to the identified web sites for presentation in association with the embedded video. In some implementations—as indicated by step 222—the ads are displayed alongside of the embedded video. For example, the video can be located in one section of the web page and the ads can be located in another section of the web page such as an area reserved for ads.

In other implementations—as indicated by step 224—the ads are inserted, associated with or otherwise combined with the video so that the ads are displayed in association with a presentation of the video. Next, the process 200 can end.

Figure 3:
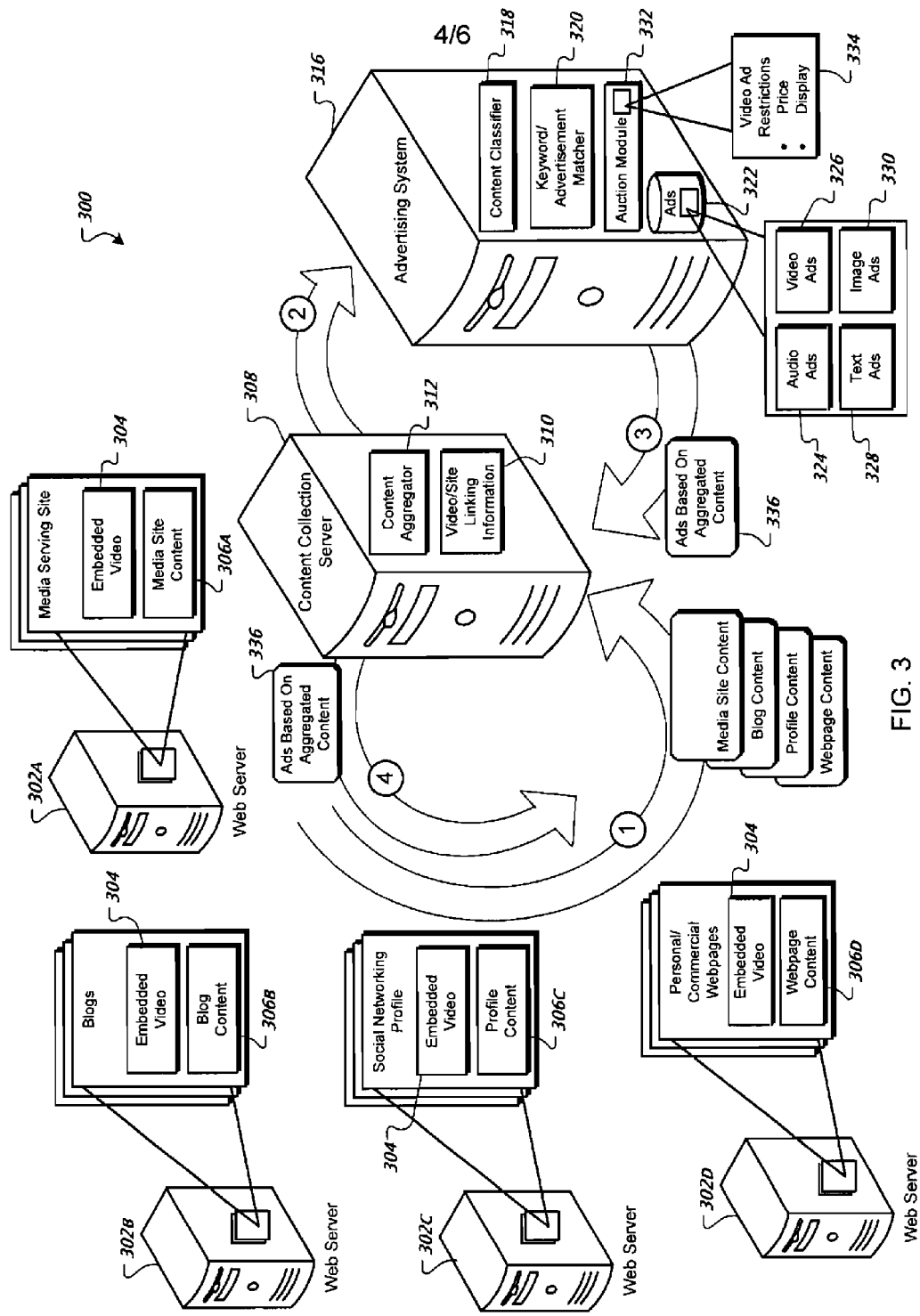
FIG. 3 is a diagram of an example system that retrieves content derived from web sites that embed a video, selects ads to present based on the aggregated retrieved content, and transmits the ads to the web sites.

FIG. 3 is a diagram of an example system 300 that retrieves content from web sites that embed a video, selects ads to present based on the aggregated retrieved content, and transmits the ads to the web sites. The system 300 includes web servers 302A-D that host media sharing web sites, blog web sites, social networking web sites, and personal or commercial web sites, respectively. In this example, each of the web sites includes an embedded video 304 and additional content 306A-D.

The system 300 also includes a content collection server 308 that identifies web sites that embed a video 304 and an advertising system 316 that select advertisements for display on the web sites that embed the video 364.

FIG. 3 includes arrows labeled "1" through "4," which indicate an example sequence of steps that the system 300 may perform. The sequence is not intended to limit an order in which the steps may be accomplished but is provided to increase the clarity of explanation. In other implementations not shown, the steps may occur in a different order. For example, some of the steps may occur in parallel.

In the first step indicated by an arrow labeled "1," the content collection server 308 retrieves content from the web sites that embed the video 304. The content collection server 308 may identify the web sites using video/site linking information 310. As described previously, the video/site linking information 310 can include information derived from logs that identify web sites that have requested a video stream from a media hosting site, where the request initiates a presentation of the embedded video 304 when a web site is loaded by an Internet browser.

In another implementation, the video/site linking information 310 can include information derived from an analysis of web pages encountered by a search engine. For example, the web pages encountered by a search engine can include code which indicates that the video is embedded in the web page.

The content collection server 308 also can include a content aggregator 312. When the content collection server 308 receives the web page content 306A-D, the content aggregator can process and combine all or a portion of the received content 306A-D. For example, the content aggregator 312 can generate aggregated content 314 based on an intersection of the received content 306A-D.

In a second step indicated by an arrow labeled "2," the content collection server 308 can transmit aggregated content 314 to the advertising system 316. The advertising system 316 can include a content classifier 318 that analyzes the aggregated content 314 and determines keywords to associate with the aggregated content. The advertising system 316 can also include a keyword/ad matcher 320 that matches the keywords generated by the content classifier 318 to ads stored in a storage device 322.

For example, each of the ads in the storage device 322 may be associated with advertising keywords that were submitted by an advertiser or automatically generated based on content of the ad. The keyword/ad matcher 320 can match the content-based keywords to the advertising keywords to determine ads that correspond to the aggregated content 314.

The ads can include a several media types. For example, the ads may be audio ads 324, video ads 326, text ads 328, or image ads 330.

The advertising system 316 can include an auction module 332 that runs auctions to determine which of the ads that match the aggregated content 314 are selected for display. For example, an advertiser can submit a bid associated with presenting the advertiser's ad. The ad(s) associated with the highest bid or group of highest bids are selected for presentation with the video.

However, the auction module can include restrictions 334 for ads that are presented with videos. In some implementations, the restrictions 334 prevent certain ads from being eligible for display with the embedded video even if the ads correspond to the aggregated content or the highest bid.

In some implementations, the restrictions 334 can include presentation restrictions for certain types of ads. For example, the auction module 332 may exclude text ads from auctions where the ad will be embedded in the video. In another example, the auction module 332 may exclude audio ads from auctions where the ad is intended to be presented alongside the video in a section reserved for advertising.

Additionally, in some implementations, the auction module 332 may set different minimum bids for different media types. For example, the minimum accepted bid for a video ad may be higher than the minimum accepted bid for a text ad. In another example, the minimum accepted bid for an ad that is inserted before playback of the video may be higher than an ad that is displayed alongside the video or inserted after the video has finished playing.

In a step indicated by an arrow labeled "3," the advertising system 316 transmits the one or more selected ads 336 to the content collection server 308, which in turn transmits the selected ads 336 to the web sites having the embedded video 304 as indicated by an arrow labeled "4." The web sites can present the selected ads 336 in association with the embedded video as described previously.

Although shown separately in FIG. 3 for clarity of explanation, the content collection server 308 and the advertising system 316 may be included in a single system or server.

Figure 4:
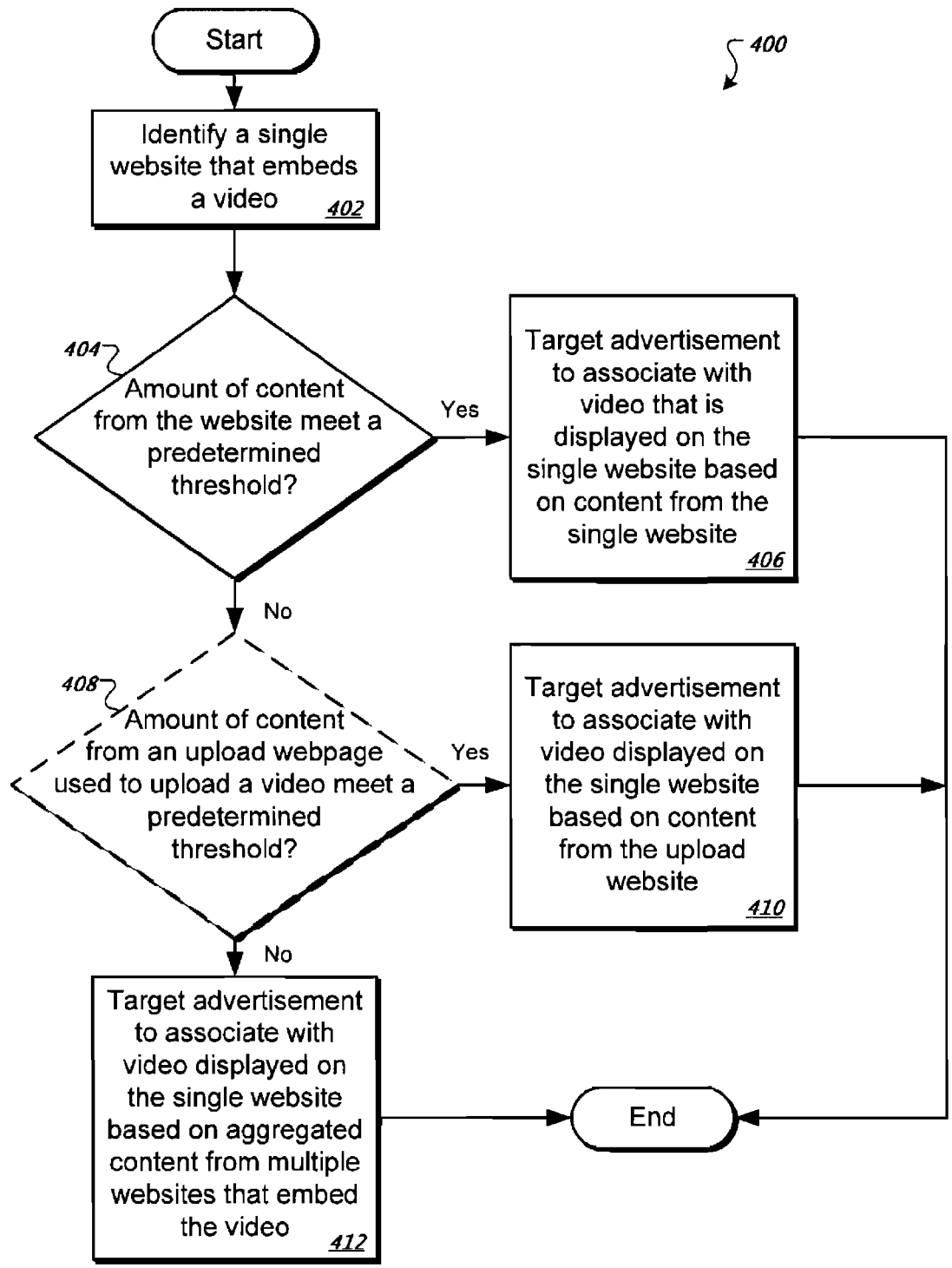
FIG. 4 is a flow chart of an example process for determining whether to target advertising to a video based on aggregated content.

FIG. 4 is a flow chart of an example process 400 for determining whether to target advertising to a video based on aggregated content. The systems 100, 300, or other systems not shown can perform the process 400. For reasons of clarity, the systems 100, 300 are used in association with the description of process 400.

The process 400 can start in step 402 where a web site that embeds a video is identified. For example, the content collection server 308 can use the video/site linking information 310 to determine which web sites have code indicating that the video is embedded.

In step 404, a determination is made whether an amount of content from the identified web site meets a predetermined threshold. In some implementations, the threshold for the content indicates whether the advertising system 316 can accurately target an ad based on the content. For example, the threshold can indicate that content from the identified web site must contain a minimum amount of words.

In another example, the threshold can indicate that the content must include a minimum amount of "descriptive" words. For instance, frequently occurring words such as articles, pronouns, and common adjectives and adverbs (e.g., very) can be excluded from words counted toward the predetermined threshold. In some implementations, words counted toward the predetermined threshold are determined using term frequency-inverse document frequency (tf-idf) scoring.

In another implementation, the threshold can indicate content from a particular section of the web site must include a predetermined number of words. For example, the threshold can indicate that the web site should have over five words in a section of the web site dedicated to describing the embedded video. One example of such a section is the "About this Video" section included in YOUTUBE web pages.

If the threshold is met, the process can perform step 406. In step 406, an ad is targeted to the video based on content from the single identified web site (but not from other web sites that embed the video). After step 406, the process can end.

If the threshold is not met, the process can perform optional step 408, in which a determination is made whether an upload web page used to upload the video has sufficient content to use in targeting an ad for the video. For example, a user can upload a video to the YOUTUBE system. The video can be accessed by viewing an upload web page hosted by the YOUTUBE system. The upload web page may include content that describes or is otherwise associated with the video.

In some implementations, the content collection server 308 or the advertising system 316 can retrieve content information from a system that hosts the video, which in this example is the YOUTUBE system. If the upload web page on the YOUTUBE system includes a predetermined amount of content, the advertising system 316 can use that content to select an ad to display in association with the embedded video on the web site (which is different from the upload web site in this example) as indicated in step 410. After step 410, the process can end.

In step 412, if it is determined that the upload web page does not have sufficient content to target an ad, an ad can be selected for presentation with the video based on content that is aggregated from multiple web pages that embed the video as previously described. Next, the process 400 can end.

Figure 5:
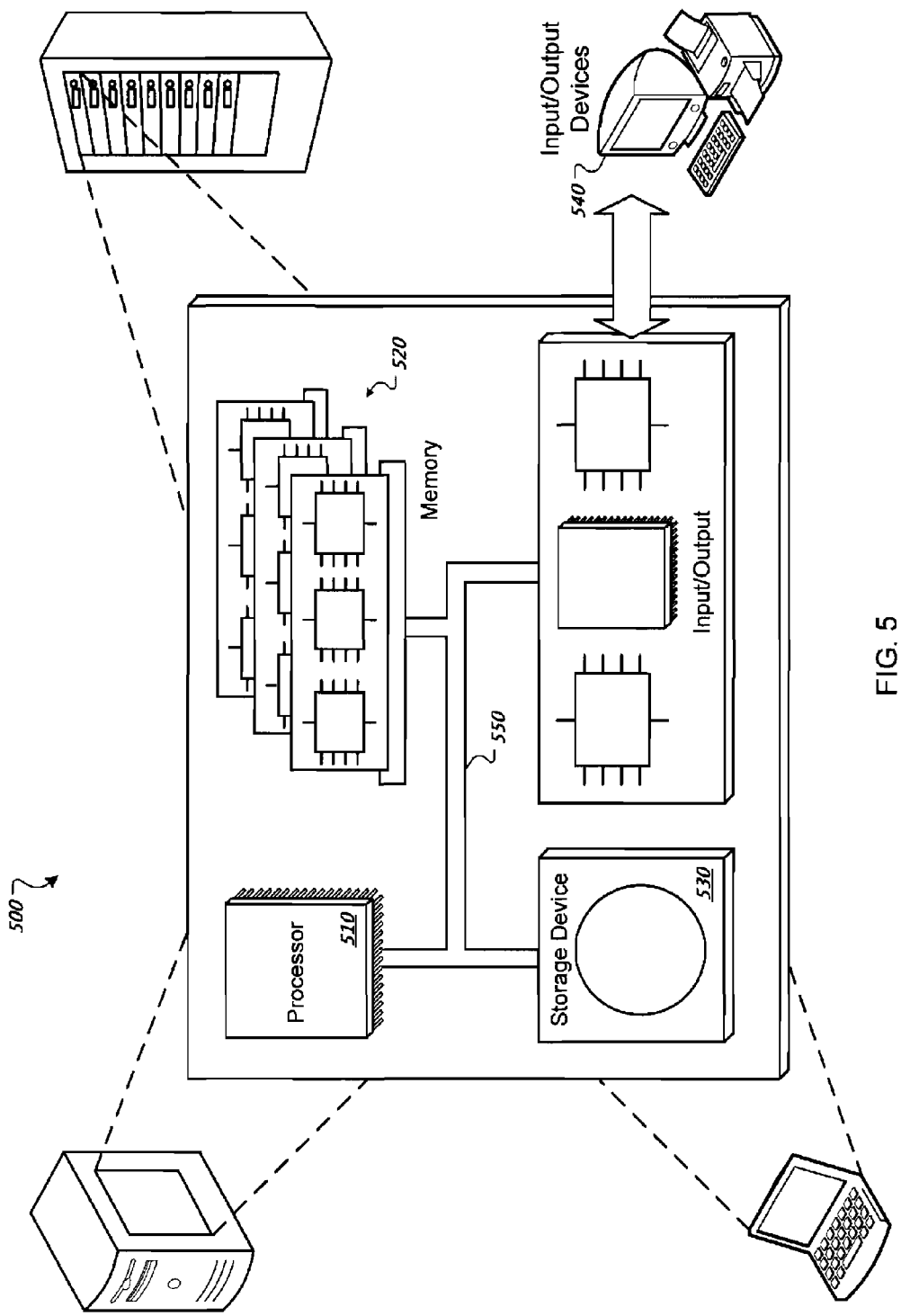
FIG. 5 is a general computing system that can be used to implement the previously described systems and processes.

FIG. 5 is a schematic diagram of a computer system 500. The system 500 can be used for the operations described in association with any of the processes or methods previously described, according to one implementation. The system 500 is intended to include various forms of digital computers, such as laptops, desktops, workstations, personal digital assistants, servers, blade servers, mainframes, and other appropriate computers. The system 500 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, although some implementations given above describe selecting advertisements to associate with videos, advertisements can be associated with other types of media as well. For example, instead of embedding videos, web sites may embed audio files. Aggregated content can be retrieved from the web sites that embed an audio file and the aggregated content can be used to select an ad to associate with the audio file. The selected ad can then be presented in association with the audio file. For example, the selected ad can include audio that is played before the embedded audio file is played.

In some implementations, the advertising content is broadly defined to include recommendations for other videos, announcements for events, and public service announcements.

In yet another implementation, when a user uploads a video to a media hosting site such as the YOUTUBE system, the user may not include content that describes the video. This may make it difficult to accurately select advertising to display in association with the uploaded video. The previously described systems and processes can be used to select an ad to display with the uploaded video based on content from one or more web sites that embed the uploaded video.

In some implementations, the systems 100, 300 can determine whether to select ads based on aggregated content or content from a single page having an embedded video by observing if the advertising system returns a threshold number of ads based on the single page. If there are too few ads returned, the advertising system can select ads based on the aggregated content.

Also, the described systems and methods are not limited to identifying a content item, such as a video, embedded in content locations, such as web pages. In other implementations, other types of content items can be identified in other types of content locations. For example, the described systems and methods may be used to identify radio programming that includes a selected audio recording. Content derived from the identified radio programming (e.g., by analyzing metadata associated with the radio programming or an audio-to-text recognition process) can be aggregated. Ads that are targeted to the aggregated content of the radio programming can be transmitted for presentation with the audio recording. For example, an audio ad can be played before or after the audio recording, where the audio ad is targeted to the content of a radio program that proceeds (or follows) the audio recording.

Similarly, the content location can include television programming. For example, the content collection server 308 can identify television programming that includes a selected video. The content collection server 308 can extract content associated with the television programming (e.g., by retrieving closed caption information, program guide information, etc. for the television programming). The advertising system 316 can select a video advertisement for display in association with the selected video, where the selection is based on the aggregated television programming content.

In another implementation, the content location can include print media, such as magazines or newspapers, and the content item can include an image or text (e.g., articles). For example, a particular image may be a stock image that a magazine employee purchases from an online image repository. In some implementations, if operators of the image repository (and the purchaser) opt to share the purchase information, information associating the magazine and purchased image can be transmitted to the content collection server 308. In some situations, several magazines may purchase the stock photo.

In some implementations, the content collection server 308 may include metadata associated with each of the magazines. For example, metadata associated with a magazine called "Computer Power User" may specify that the magazine is related to computers, video games, gadgets, and programming. The purchase information may indicate that the magazine "Computer Power User" as well as five other magazines purchased the stock photo. The content collection server 308 can aggregate the metadata from the magazines that purchased the stock photo, and the advertising system 316 can select a text or image ad to place in one or more of the magazines using a system similar to GOOGLE'S AD WORDS for print ads.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
   identifying, by a computer system, a digital video hosted at a media-hosting server;
   analyzing, by the computer system, a log comprising website identifiers recorded when the digital video is requested for presentation by one or more applications executed by respective computing devices;
   identifying, by the computer system, a plurality of websites corresponding to website identifiers recorded in the log, each identified website respectively comprising an embedded instance of the digital video and at least one additional content element;
   aggregating, by the computer system, the additional content elements from the plurality of websites into a content collection;
   selecting, by the computer system, an advertisement to present with the digital video based on the aggregated additional content elements of the content collection;
   receiving, by the computer system from a first application executed by a first computing device, a request to present the digital video; and
   transmitting, by the computer system to the first computing device in response to the received request, the selected advertisement for presentation with the digital video.

2. The computer-implemented method of claim 1, wherein the advertisement is inserted into the digital video while the digital video is played.

3. The computer-implemented method of claim 1, wherein the advertisement is presented alongside the digital video.

4. The computer-implemented method of claim 1, further comprising receiving, by the computer system, the digital video.

5. The computer-implemented method of claim 1, further comprising:
   transmitting, by the computer system, the aggregated additional content elements of the content collection to an advertising system that selects the advertisement based on the aggregated additional content elements of the content collection.

6. The computer-implemented method of claim 1, wherein aggregating the additional content elements comprises:
   identifying one or more of: words, phrases, or subjects, that respectively occur in more than one of the plurality of websites; and
   including, in the content collection, the identified words, phrases, or subjects.

7. The computer-implemented method of claim 1, wherein aggregating the additional content elements comprises concatenating, in the content collection, content elements derived from each of the plurality of websites.

8. The computer-implemented method of claim 7, wherein aggregating the additional content elements further comprises generating a virtual composite content location that comprises the concatenated content.

9. The computer-implemented method of claim 8, further comprising transmitting the virtual composite content location to an advertising system that determines advertisements to associate with the virtual composite content location and determines advertisements to associate with actual content locations.

10. The computer-implemented method of claim 1, further comprising restricting a selection of the advertisement for transmission based on a media type of the advertisement.

11. The computer-implemented method of claim 1, further comprising adjusting a cost for presenting the advertisement based on a media type of the advertisement.

12. The computer-implemented method of claim 1, further comprising:
    adjusting a cost for presenting the advertisement by a first value responsive to the advertisement being inserted in the digital video or
    adjusting the cost for presenting the advertisement by a second value responsive to the advertisement being presented alongside the digital video.

13. The computer-implemented method of claim 1, wherein transmitting the advertisement is in response to determining that an individual network location associated with an upload of the digital video does not include a threshold amount of content for use in associating advertisements with the digital video.

14. The computer-implemented method of claim 1, wherein transmitting the advertisement is in response to determining that an individual website embedding the digital video does not include a threshold amount of content for use in associating advertisements with the digital video.

15. The computer-implemented method of claim 1, wherein transmitting the advertisement is in response to a determination that a threshold number of advertisements was not returned when selecting the advertisement based on content derived from an individual network location.

16. The computer-implemented method of claim 1, wherein the plurality of websites includes web pages that deliver television programming.

17. The computer-implemented method of claim 1, further comprising deriving, by the computer system, content associated with the plurality of websites by identifying one or more related network locations associated with the plurality of websites and retrieving content from the one or more related network locations.

18. The computer-implemented method of claim 17, wherein the related network locations are associated with a same web domain as at least one of the plurality of websites.

19. The computer-implemented method of claim 17, wherein the related network locations link to at least one of the plurality of websites or at least one of the plurality of websites link to the related network locations.

20. A computer-implemented method comprising:
    identifying, by a computer system, non-textual media hosted at a media-hosting server;
    identifying, by the computer system, a plurality of websites that each embed the non-textual media by systematically browsing multiple different network locations and identifying markup language associated with the non-textual media, each identified website respectively comprising an embedded instance of the non-textual media and at least one additional content element;

aggregating, by the computer system, the additional content elements from the plurality of websites into a content collection;
selecting, by the computer system, an advertisement to present with the non-textual media based on the aggregated additional content elements of the content collection;
receiving, by the computer system from an application executed by a computing device, a request to access the non-textual media; and
transmitting, by the computer system to the computing device in response to the received request, the selected advertisement for presentation with the non-textual media.

21. The computer-implemented method of claim 20, wherein the non-textual media comprises at least one of: video media, audio media, or image media.

22. The computer-implemented method of claim 1, wherein the aggregated content does not directly describe the digital video.

23. A computer-implemented method comprising:
receiving, by a computer system from an application executed by a first computing device, a request for a first electronic document that includes an embedded digital video;
analyzing, by the computer system, a log comprising resource identifiers recorded when the digital video is requested for presentation by one or more applications executed by respective computing devices;
identifying, by the computer system, a plurality of electronic documents corresponding to resource identifiers recorded in the log, each identified electronic document respectively comprising an embedded instance of the digital video and at least one additional content element;
aggregating, by the computer system, the additional content elements from the plurality of electronic documents into a content collection;
selecting, by the computer system, an advertisement to present in the first electronic document with the embedded digital video based on the aggregated additional content elements of the content collection; and
providing the selected advertisement responsive to the received request for a first electronic document.

24. The computer-implemented method of claim 23, further comprising:
determining that the first electronic document includes a quantity of additional content elements less than a threshold amount needed for selecting an advertisement to display with the embedded video; and
identifying the plurality of electronic documents, and selecting the advertisement based on the aggregated additional content elements of the content collection, responsive to the determination that the first electronic document includes less than the threshold amount of additional content elements.

25. The computer-implemented method of claim 1, further comprising:

identifying a particular website in which the digital video given content is embedded;
determining that the particular website includes less than a threshold amount of content for use in selecting an advertisement for display with the digital video; and
determining to select the advertisement based on the aggregated content rather than based on the content of the particular website in response to determining that the particular website includes less than the threshold amount of content.

26. A system comprising computer-readable memory and at least one computer processor, the at least one computer processor configured to execute instructions from the computer-readable memory that cause the at least one computer processor to:
identify a non-textual media item hosted at a media-hosting server;
analyze a log comprising website identifiers recorded when the non-textual media item is requested for presentation by one or more applications executed by respective computing devices;
identify a plurality of websites corresponding to website identifiers recorded in the log, each identified website respectively comprising an embedded instance of the non-textual media item and at least one additional content element;
aggregate the additional content elements from the plurality of websites into a content collection;
select an advertisement to present with the non-textual media item based on the aggregated additional content elements of the content collection;
receive, from a first application executed by a first computing device, a request to present the non-textual media item; and
transmit, to the computing device in response to the received request, the selected advertisement for presentation with the non-textual media item.

27. The system of claim 26, the at least one computer processor configured to execute instructions from the computer-readable memory that cause the at least one computer processor to:
aggregate the additional content elements by generating a virtual composite content location that comprises concatenated content elements derived from each of the plurality of websites; and
select the advertisement by providing the virtual composite content location to an advertising system that determines advertisements to associate with the virtual composite content location and determines advertisements to associate with actual content locations.

28. The system of claim 26, wherein the non-textual media comprises at least one of: video media, audio media, or image media.

29. The computer-implemented method of claim 8, wherein the virtual composite content location comprises a virtual web page that comprises the concatenated content.

* * * * *